Sept. 3, 1929.　　　　　L. BLÉRIOT　　　　　1,727,095
AERIAL ADVERTISING AND SIGNALING DEVICE
Filed June 6, 1927
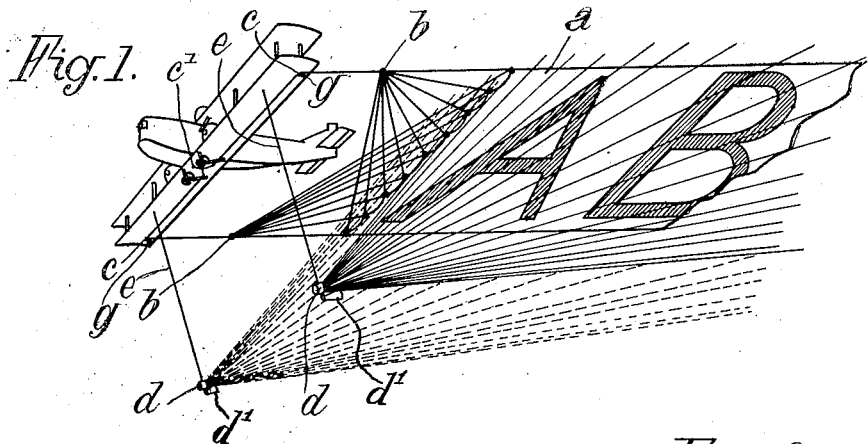
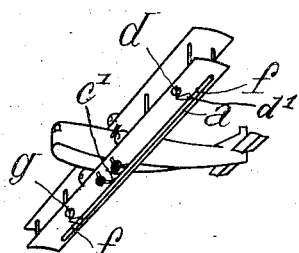
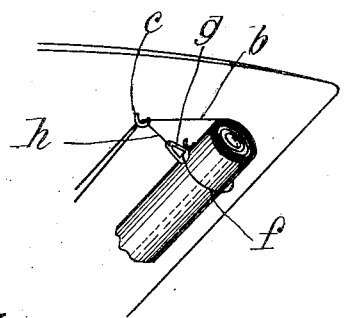
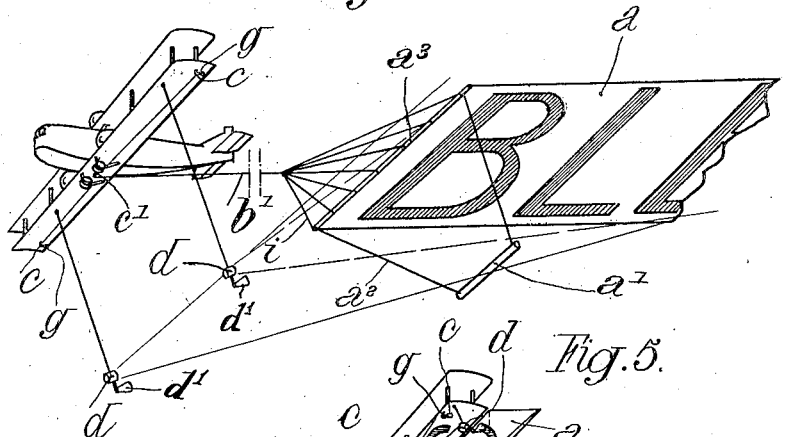
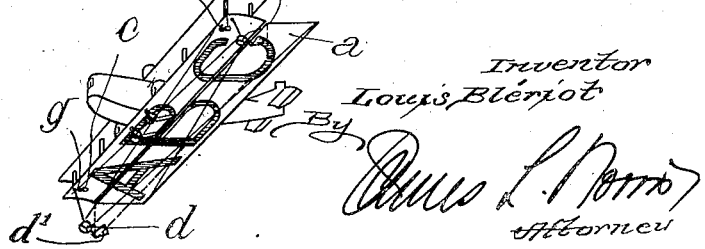
Inventor
Louis Blériot
By
Attorney Patented Sept. 3, 1929.

1,727,095

UNITED STATES PATENT OFFICE.

LOUIS BLÉRIOT, OF PARIS, FRANCE.

AERIAL ADVERTISING AND SIGNALING DEVICE.

Application filed June 6, 1927, Serial No. 196,874, and in Belgium June 12, 1926.

The present invention relates to devices adapted to be used for aerial signaling and advertising.

One of the objects of the invention is to provide structures capable of being attached to aeroplanes and similar aeronautical machines and which can be towed over the place where the signal or advertising is to be displayed.

Other objects will appear in the course of the detailed description which will now be given with reference to the accompanying drawings in which:—

Fig. 1 is a perspective of one form of the invention showing the display device in extended position;

Fig. 2 shows the device illustrated in Fig. 1 (and also the one represented in Fig. 4) with the display device rolled up;

Fig. 3 is an enlarged detail of Fig. 2;

Fig. 4 shows a second form of the invention;

Fig. 5 represents still another embodiment of the invention.

Referring to Figures 1 to 3 of the drawings, there is shown a sheet $a$ (made of silk or any other light and flexible material) having characters painted thereon or attached thereto, and a pair of main towing cables extending from each wing of the aeroplane to sheet $a$. Each main towing table carries a web of auxiliary cables which radiate from points $b$, intercross behind the plane, and terminate at points spaced along the front end of the sheet. The main towing cables pass through guides $c$ located near the extremity of each wing, then through guides $c^1$ located near the center line of the plane, and finally into the aeroplane fuselage where they can be lengthened or shortened at the will of the aviator or completely let loose just prior to a landing operation. For night displays a pair of reflecting light sources $d$ may be suspended from cables $e$, and held in proper orientation to sheet $a$ by wind vanes $d^1$. Cables $e$ pass, preferably through the wings, then into the fuselage and it suffices only for the aviator to take in on the cable to bring illuminators $d$ under the wings.

In the modification illustrated in Fig. 4, the pair of main towing cables are replaced by a single main cable $b^1$ carrying a web of radiating auxiliary cables $i$. Sheet $a$, in this form of the invention is fitted with a stiffening rod $a^3$ and with a stabilizer $a^4$ consisting of a rod of appropriate weight suspended by cables $a^2$ from rod $a^3$. A single element $c^1$ located under the center of gravity of the machine guides cable $b^1$ into the fuselage and permits the latter to be lengthened, shortened or released completely before landing.

This form of the invention may be fitted with the illuminating auxiliaries described in connection with Fig. 1 i. e. with the illuminators attached to the plane.

The means shown in Figs. 2 and 3 for maintaining sheet $a$ in rolled up position prior to being released may be used with either one of the modifications shown in Figs. 1 and 4. Fig. 3 shows these means applied to the device illustrated in Fig. 1, but it is obvious that there the shift of cables $b$ from the ends to the center of the sheet does not in the least alter the mode of operation. In either case, sheet $a$ is rolled up with its free end at the center of the roll and is so held by a pair of cords $f$ passing completely around the roll. Cords $f$ are threaded through a loop $g$ which is attached to a cable $h$ passing through guides $c$ to the fuselage. The aeroplane being in flight, the aviator pulls on cables $h$ hard enough to snap cords $f$. Sheet $a$ then unfurls and takes its position in tow of the plane.

If desired the unfurling may be accomplished by means of a pair of forks formed to support the rolled-up sheet and arranged to be tilted backward by a system of cables extending into the fuselage.

The modification shown in Fig. 5 differs from those already described in that the display sheet is attached directly to the lower wing of the plane instead of being suspended from cables. Sheet $a$ which here may be secured to the rear edge of the lower wing swings from the dotted line position to horizontal position as soon as the plane is in operation.

This form of device may be fitted with the illuminators and, where sheet $a$ is flexible, with the unfurling auxiliaries shown in Figs. 1 to 3.

I claim:

1. A device of the class described comprising a flying machine, and a sheet connected by one of its extremities to said machine and adapted to be rolled up, said sheet being rolled up so that its free end is at the center of the roll.

2. A device of the class described comprising a flying machine, a sheet, a single cable connected to and extending from under the center of gravity of the flying machine for towing said sheet, and means for connecting said cable and said sheet and for holding the sheet in extended position.

3. A device of the class described comprising a flying machine, a sheet, a single cable connected to and extending from under the center of gravity of the flying machine for towing said sheet, means for connecting said cable and said sheet and for holding the sheet in extended position, and a stabilizing element connected to said sheet and serving to control the movement of said sheet in flight.

4. A device of the class described comprising in combination a flying machine, a sheet adapted to be towed behind said flying machine, towing means connecting said sheet to the machine, and adjustable illuminating means positioned to project a beam of light on said sheet while the latter is being towed behind the flying machine.

5. A device of the class described comprising in combination, a flying machine, a sheet gathered up in proximity to said machine, a releasing mechanism associated with said sheet and adapted to release the latter from its gathered up position, and towing means connecting said sheet to the machine.

6. The method of operating a flying machine having a sheet in tow therewith comprising the steps of unfurling said sheet during flight, towing said unfurled sheet, and releasing said sheet from its connections to the flying machine prior to a landing operation.

7. A device of the class described comprising in combination a flying machine, a sheet adapted to be towed by said machine, a single cable extending from under the center of gravity of the machine for towing said sheet, a rigid transverse rod attached to said sheet and adapted to maintain the latter in a spread position, means connecting said rod and said cable, and an elongated stabilizing element suspended from said rigid transverse rod.

In testimony whereof I have hereunto set my hand.

LOUIS BLÉRIOT.